United States Patent [19]

Sloan et al.

[11] Patent Number: 5,360,554
[45] Date of Patent: Nov. 1, 1994

[54] PHASE SEPARATION BY GAS EVOLUTION

[75] Inventors: Jack C. Sloan; Walter Lurie, both of Denver, Colo.; Adrian C. Ferramosca, Weybridge, United Kingdom

[73] Assignee: Parhelion, Inc., Denver, Colo.

[21] Appl. No.: 192,725

[22] Filed: Feb. 7, 1994

[51] Int. Cl.$^5$ .............................. C02F 1/22; B01D 9/04
[52] U.S. Cl. ..................................... 210/768; 210/774; 210/805; 210/808; 62/532
[58] Field of Search ................ 210/742, 768, 774, 805, 210/808; 62/532, 533, 535, 537, 542, 48.2

[56] References Cited

U.S. PATENT DOCUMENTS

| | | |
|---|---|---|
| 3,070,969 | 1/1963 | Ashley et al. . |
| 3,213,633 | 10/1965 | Rosenstein et al. ................ 62/535 |
| 3,214,371 | 10/1965 | Tuwiner ............................. 62/533 |
| 3,474,635 | 10/1969 | Rowe, Jr. . |
| 3,664,145 | 5/1972 | Johnson ............................. 62/537 |
| 3,856,492 | 12/1974 | Klass . |
| 4,236,382 | 12/1980 | Cheng ............................... 62/537 |
| 4,505,728 | 3/1985 | Cheng ............................... 62/542 |
| 5,084,187 | 1/1992 | Wilensky .......................... 210/768 |
| 5,167,838 | 12/1992 | Wilensky .......................... 210/768 |

Primary Examiner—Robert A. Dawson
Assistant Examiner—Sun Uk Kim
Attorney, Agent, or Firm—Dorr, Carson, Sloan & Peterson

[57] ABSTRACT

A solute can be separated from a solute/solvent solution by dissolving a gas-forming material into said solution and then adjusting the temperature, pressure and solute concentration of the resulting solution such that a Joule-Thompson free expansion of the gas-forming material released from the solution will produce a three-phase separation of the components of said solution.

27 Claims, 2 Drawing Sheets

PHASE SEPARATION BY GAS EVOLUTION

BACKGROUND OF THE INVENTION

1. Field of the Invention

This invention is generally concerned with the use of freezing conditions in order to accomplish a degree of separation of a solvent or solute from a solute/solvent liquid solution. It is particularly concerned with the use of gas evolution to produce such freezing conditions. The herein disclosed processes have many useful ecological and industrial purposes, but they are especially well suited for: (1) converting seawater, brackish water, etc., into potable water, (2) recovering metals such as magnesium from seawater or other salt-containing bodies of water, (3) demineralizing "fresh" waters used to make carbonated beverages, (4) recovering solutes and/or solvents from industrial solute/solvent solutions and (5) cleaning up polluted bodies of water such as lakes, rivers, streams, groundwaters, etc.

Numerous methods have been suggested and/or developed for employing freezing conditions to produce potable water or other "pure" solvents or solutes from solute/solvent solutions. Most of these processes have not, however, experienced wholehearted acceptance. For example, one of the principal problems inherent in most desalination processes that employ freezing conditions as their modus operandi is their inability to produce potable water at economically acceptable costs. Not only must these processes be able to produce large volumes of potable water, they also must be able to do so at locally acceptable costs. Cost considerations are particularly important because many areas of the world having the most acute potable water shortages also are characterized by their very low income levels.

In many processes employing freezing conditions to produce potable water, the subject water is simply frozen to produce an ice product that is then melted to obtain "pure" water. Flash-freezing is also employed to produce water vapor products that are recondensed to obtain pure water. Both of these freezing techniques require a great deal of expensive refrigeration and/or compressor capacity. Flashfreezing techniques are especially expensive because they employ vacuum/freezer apparatus wherein a vacuum must be created to evaporate the entire volume of the water thus produced. Such evaporation can only be accomplished by the expenditure of a great deal of mechanical work. The water vapor thus created then must be condensed back to its liquid form by another large expenditure of mechanical work. The refrigeration, vacuum creation and condensation steps of such processes require considerable amounts of mechanical and/or electrical energy that can only be obtained at high fuel and capital costs. Consequently, freezing and flash-freezing processes have not been widely employed to produce potable water. Another approach to lowering the expenses associated with freezing a solute/solvent solution involves dissolving a gas such as carbon dioxide into such a solute/solvent solution. Then, after the temperature and pressure of the solution is adjusted, a Joule-Thompson free expansion of the resulting solute/solvent solution is forced by spraying it through a nozzle. In effect, this spraying produces a three phase separation of the solute/solvent solution.

2. Description of the Prior Art

U.S. Pat. Nos. 5,084,187 ("the 187 patent") and 5,167,838 ("the 838 patent") to Wilensky (hereinafter the "Wilensky patents") represent the closest art to the processes described in this patent disclosure. Indeed, many of the teachings of the Wilensky patents help to clarify the teachings of the present patent application, and hence, these patents are incorporated herein by reference. Generally speaking, the Wilensky patents teach that a solute can be separated from a solute/solvent solution by: (a) dissolving a gas such as carbon dioxide into the solution to produce a single-phase composite liquid, (b) raising the pressure on the liquid, (c) lowering the temperature of the liquid and (d) performing a Joule-Thompson free expansion on the entire mass of composite liquid by spraying it through a nozzle under pressure supplied by a pump.

Applicants have postulated that Wilensky's method of performing his Joule-Thompson free expansion—forcing the entire liquid mass through a nozzle—may not achieve maximum ice production for a given expenditure of mechanical energy. Applicants do not wish to be strictly bound to such a theory, but they have reason to believe that a lower than theoretically possible amount of ice production by the Wilensky processes may follow from the fact that the carbon dioxide vapors produced by a Joule-Thompson free expansion of an entire liquid mass through a nozzle may not provide sufficient time to fully associate the emerging carbon dioxide vapors with the liquid-phase material (e.g., brine). This lack of association time between the carbon dioxide vapor and liquid-phase material (e.g., water) tends to limit production of a small (but very important) amount of solvent vapor (e.g., water vapor) from the liquid phase material (e.g., water) when pressure is suddenly released from the liquid just after it clears the nozzle employed in the Wilensky processes. Applicants believe that the carbon dioxide/liquid exposure time is particularly important because of its effect on the amount of solvent vapor that can be created by such a process. This, in turn, is important because the water vapor provides most of the refrigeration created these vaporization processes. In other words, applicants have determined that greater amounts of ice can be formed as more solvent (e.g., water) vapor is produced. Consequently, applicants' processes are designed to produce more water vapor than can be created from the Wilensky processes with comparable energy expenditures. Moreover, the herein described processes, at the very least, save the mechanical energy needed by the Wilensky processes to pump an entire mass of liquid through a nozzle constriction to achieve a Joule-Thompson free expansion of the entire mass of that liquid.

SUMMARY OF THE INVENTION

Applicants have determined that the previously noted technical problems and/or economic drawbacks associated with Joule-Thompson ("J-T") free expansions of an entire solute/solvent mass through a nozzle can be mitigated by use of the herein described three-phase separation processes wherein only the vapor products of applicants' J-T free expansion (rather than their entire liquid mass) are expanded through a nozzle (indeed, through a valve having very little or no constriction of its bore). In effect, only the vapors formed by applicants' Joule-Thompson free expansion processes travel from a pressure vessel holding the liquid to a second tank which is adapted to receive the "flashed" vapor products of the J-T free expansion.

However, as with the Wilensky processes, the processes of the present patent disclosure are based on evaporation of one or more dissolved, gas-forming material(s) (e.g., carbon dioxide gas, carbon dioxide liquid, dry ice, $SO_2$ gas, etc.) from a solute/solvent solution (e.g., seawater) that has been specially prepared with respect to its temperature, pressure and solute concentration to produce a three phase separation of the solution when the pressure on the solution is suddenly lowered. For the purposes of this patent disclosure, the expression "gas-forming material" particularly refers to the material's ability to go into a gaseous state at those temperature and pressure conditions existing just after applicants' J-T free expansion step is initiated. The initiation of applicants' J-T free expansion is best accomplished by quickly releasing the pressure on the liquid contents of applicants' hereinafter described pressure vessel system and allowing the resulting vapors to escape to a void space of sufficient capacity to allow the vapor products of the J-T free expansion to be formed in, and escape from, the pressure vessel. Thus, most of the liquid remains in the pressure vessel. The void space to which the vapors escape is most preferably provided in the form of a second vessel and/or an open line that leads to a jet eductor system that carries the $CO_2$ vapor and water vapor products of applicants' J-T free expansion back to a preceding stage of their overall process. It also should be noted in passing that applicants' processes can be characterized as non-equilibrium processes.

Next, it should be noted that for the purposes of this patent disclosure the terms "gas" and "vapor" are used interchangeably. Regardless of terminology, however, it is the release of the gas-forming material (e.g., $CO_2$) and solvent vapors (e.g., water vapor) from a pressure vessel into a second vessel which "drives" applicants' three-phase separation processes. However, release of such a gas-forming material (and a small amount of water vapor) will take place as a result of applicants' J-T free expansion only if the subject solute/solvent solution has been prepared (by methods hereinafter more fully described) in a manner calculated to produce a three-phase separation of the solute/solvent solution into distinct solid, liquid and gas phases.

Applicants' processes may be thought of as beginning when a solute/solvent solution is obtained from a source such as the sea and a controlled amount of a gas-forming material such as $CO_2$ liquid, $CO_2$ gas, $SO_2$ gas, dry ice, etc., is dissolved into that solute/solvent solution. Thus, the gas-forming material must be "partially soluble" in the solution into which it is introduced. Indeed, for the purposes of this patent disclosure, the term "partially soluble" means that the gas-forming material is sufficiently soluble in the solute/solvent solution to readily dissolve upon being injected into the solution and that, concomitantly, the gas-forming material also is sufficiently "insoluble" in the liquid-phase product of the J-T free expansion so that when the system's nominal high pressure is released to its nominal low pressure, the gas-forming material will go into a gas phase. The formation of this gas phase implies that the heat of vaporization of that gas will be taken from its surroundings and thereby produce an energy disequilibrium in the system. This disequilibrium, in turn, forces the overall system to create a small amount of solvent vapor whose production creates the refrigeration necessary to satisfy the equilibrium conditions existing at the new conditions created when a valve between the pressure vessel holding the pressurized liquid and an "empty" flash tank is suddenly opened. The combined vaporization (e.g., of the $CO_2$ and water) produces a degree of chilling of the materials present such that the temperature of these materials approaches the triple point temperature of a single-phase solution of the subject liquid.

Consequently, gases that are only slightly soluble, such as nitrogen and air, are not well suited to the practice of this process (at least in the context of aqueous systems) since nitrogen and air are only very sparingly soluble in water. On the other hand, the gas that is formed as a result of the J-T free expansion step of these processes should not be so soluble that, when the system's nominal high pressure is released to the system's nominal low pressure, the gas-forming material will remain in solution. Rather, under that low pressure, the gas-forming material will be vaporized and, in so doing, take up its heat of vaporization from the materials surrounding it (i.e., from any remaining solute and solvent materials). Therefore, certain gases such as ammonia gas and hydrogen chloride gas, which are highly soluble in water and, hence, would not readily evaporate out of the solution under such low pressure conditions, are not well suited to the practice of this invention, at least in the context of aqueous systems.

Carbon dioxide gas and sulfur dioxide gas, by way of contrast, are much better suited to the practice of applicants' processes in aqueous systems since they will readily dissolve in water and subsequently will readily evaporate under the low pressure conditions employed in applicants' processes. Also, when the end product of a given process is to be potable water, carbon dioxide is virtually the only suitable gas for the practice of this invention. Sulfur dioxide is suitable from a purely physical point of view, that is, with respect to its ability to first dissolve and then vaporize under the appropriate temperature and pressure conditions, but it is not suited in situations where "potable" water is the desired end product since any sulfur dioxide left in the solution will form acids that should not be ingested. At this point, also note that carbonated water as well as "pure" water are each possible "potable" water end products of this process and that carbonated water will often have a much higher economic value than uncarbonated water.

The gas produced by the J-T free expansion step of the herein described processes also should be of greater volatility than that of the solvent vapor. For example, carbon dioxide vapor is more volatile than water vapor. The gas-forming material also may be selected on the basis of other criteria such as non-toxicity, low cost, ready availability, etc. But, regardless of any of its other attributes, the gas-forming material must be such that: (a) at the system's nominal high pressure, i.e., the pressure to which the liquid is subjected in the pressure vessel, at least a sufficient amount of gas will dissolve in the solute/solvent solution to create some refrigeration when it subsequently escapes, (b) at the system's nominal low pressure (the pressure in a second or flashing tank), a "major" portion of the dissolved gas-forming material will quickly come out of solution and (c) the evaporation of the major portion of the gas will be such that its acquisition of its latent heat of vaporization, when it evolves as a result of applicants' J-T free expansion, will be sufficient to begin to chill a mass of the liquid material and help to produce a disequilibrium that causes a "minor" portion of the solvent component of the liquid (e.g., water) to go into its vapor state and thereby further help lower the temperature of the entire mass to a temperature near its eutectic temperature.

For the purposes of this patent disclosure the evolution of a "major" portion of the gas-forming material (e.g., $CO_2$, $SO_2$, etc.) means that at least about 25 weight percent (and more preferably at least 50 weight percent and most preferably at least 90 weight percent) of the gas-forming material originally dissolved in the solvent. However, note carefully that formation of vapors of the gas-forming material(s) will very often "account" for less than about 10 weight percent of the ice formed. Indeed, in many cases the energy (e.g., expressed in BTUs) needed to vaporize the gas-forming material will account for only about 1 to 2 percent of the energy needed to form the solid product (e.g., ice) that is actually produced. For example, applicants have found that the energy in 3.5 gas volumes of $CO_2$ dissolved in 1 liquid volume of a 3 percent sodium chloride/water solution accounts for less than about 2 percent of the refrigeration needed to produce the amount of ice actually produced. The remaining refrigeration needed to produce the ice in this example is produced by vaporization and/or entrainment of a very small amount of solvent vapor when applicants' J-T free expansion is initiated.

Thus, the very "minor amount" of solvent (i.e., minor with respect to the mass of the entire solution) that is vaporized will normally produce from about 70 to about 99 percent of all the refrigeration needed to form a given amount of ice in many of the herein disclosed processes. Vaporization of the gas-forming material will account for the remainder of the refrigeration. Again, in referring to the above example (i.e., using 3.5 gas volumes in a 3 percent salt/water solution), applicants have determined (using a figure of 144 BTUs per pound as the heat of fusion of water) that formation of the water vapor component of the overall carbon dioxide/water vapor product of the J-T free expansion accounts for about 98 percent of the ice formed, while the heat of vaporization of the carbon dioxide present in the original carbon dioxide/salt/water solution accounts for only about 2 percent of the ice thus formed. In other words, even though the weight of water vapor thus produced is very small, it is "mighty" in its ability to produce the refrigeration needed to freeze large amounts of ice relative to the refrigeration-producing ability of carbon dioxide vapor. Thus, applicants have designed their process with the aim of maximizing production of the water vapor component of the vapor-phase product of their J-T free expansion.

Several factors and procedures other than selection of a proper gas-forming material will have to be employed before applicants' processes can be used to produce products such as potable water on a large-scale basis at economically acceptable costs. These other factors may, among other things, include recovery of the $CO_2$ (or other gas-forming material used in the process) as well as recovery of the refrigeration available in the products (e.g., the refrigeration contained in the ice, brine and/or $CO_2$) of the three-phase separation. Large-scale versions of applicants' processes will also usually have to provide for dissipation of the heat of condensation associated with reintroducing vapors of the gas-forming material (e.g., carbon dioxide vapor) and solvent vapor (e.g., water vapor) back into an incoming stream of solvent/solution (e.g., seawater).

Next, it should be noted that the materials produced by applicants' processes may occur in widely differing amounts and degrees of contamination. Consequently, they may constitute a distinct advantage, or a distinct disadvantage, to any given overall version of these processes from both the economical and/or the technical points of view. In any case, the collection and separation of such materials may be regarded as "secondary product(s)" of the herein described processes. Nonetheless, the recovery of such secondary product(s) also may constitute very important additional preferred steps to the fundamental processes of this patent disclosure. Moreover, depending on the amounts of product actually present, or made possible, various products of this process may be permitted to accumulate through any or all of the several stages of the overall three-phase separation process described in this patent disclosure. Thus, for example, solutes may be recovered by any one or more of the gamut of solid separation methods generally known to the process engineering arts, e.g., filtration or blow-down disposal, as well as use of settling basins, thickening agents, etc.

Of these methods, blow-down disposal is perhaps the most relevant to applicants' processes. Those skilled in the chemical engineering arts will appreciate that the term "blow-down" describes a particularly convenient means of getting rid of small amounts of a foreign material such as a precipitate. The most important aspect of blow-down as it relates to this invention is that as long as any constant volume of an inventory is taken out of a stream at a point of purifying separation, the concentration of foreign material dissolved or suspended increases by accumulation in the inventory. Thus, when the operation steadies to constancy, the process removes all of the entering foreign material, as long as enough is taken out to prevent letting the foreign material accumulate until the resulting fluid becomes too thick to handle. In any case, blow-down is a particularly convenient, automatic way of getting rid of small amounts of foreign material because no matter how much one takes out on a constant basis, its concentration gets up to a point where the blow-down operation takes out exactly as much of it as one puts in originally. Thus, in some highly preferred embodiment of this invention, the processes heretofore described may further comprise separating a liquid phase into a constant recycle quantity and a remaining "blow-down" quantity composed of the starting material total solute and the unsolidified liquid remainder of starting material solvent in proportions up to and approaching eutectic (solubility) composition of the starting material components.

In some particularly preferred embodiments of applicants' invention, a specific quantity of a liquid-phase product of the JT free expansion will be recycled back to some previous point in the process in order to adjust the solute concentration of an incoming portion of a starting material solution to that of a combined solution resulting from such mixing of an incoming solute/solvent solution with recycled products of the J-T free expansion. In such cases, a given recycled quantity of liquid-phase product can vary with any given process; but, in the most preferred embodiments of these "liquid-phase recycle" versions of applicants' invention, the recycled quantity of recycled liquid-phase product will be a constant quantity designed to achieve a particular "steady state" operation. In many cases this recycled quantity of liquid product (e.g., brine) will have a solute concentration that, being the same as that of the net liquid product, approximates the eutectic concentration of the starting solute/solvent solution. For example, the eutectic concentration of seawater is about a 26% solution. However, there also may be cases where the recycled quantity is adjusted to less than the eutectic concentration of the solute/solvent solution.

Such additional process steps also may include reiteration of the above-noted three-phase separation processes on a product of reduced solute concentration achieved by melting the solid-phase product (e.g., ice) of a preceding stage of such processes. That is, if the processes of this patent disclosure do not achieve a desired degree of purification on a "first pass" through the herein described processes (e.g., due to high levels of surface brine contamination of the ice), then the melted ice product of a first pass through such processes can be sent through second, third, etc., iterations of such processes until a desired purity level is achieved in a given product. The herein described processes also may be used in tandem with other completely different desalination processes such as those based on filtration, settling, reverse osmosis, etc.

Expressed in patent claim language, one of the most fundamental embodiments of applicants' invention would be a process for separating a solute from a solvent which together constitute a solute/solvent solution starting material having an initial solute concentration, said process comprising: (1) dissolving a gas-forming material into the solute/solvent solution to produce a dissolved gas/solute/solvent solution; (2) lowering the temperature of the dissolved gas/solute/solvent solution to a jumping off temperature to produce a liquid having a solute concentration and temperature that are such that a release of a nominal high pressure on the solution to a nominal low pressure results in evaporation of a major portion of the gas-forming material as well as evaporation of a minor portion of the solvent as vapors that take their respective heats of vaporization in amounts such that the temperature of an entire mass of the solution is lowered to a temperature that approximates the triple point temperature of said solution; (3) placing the solution in a pressure vessel; (4) bringing the solution in the pressure vessel to the nominal high pressure; (5) rapidly releasing the nominal high pressure and thereby allowing a major portion of the gas-forming material and a minor portion of the solvent to form vapors that undergo a J-T free expansion into a closed second vessel having a nominal low pressure and thereby obtaining three phases of resultant materials that each have a temperature approximating the triple point temperature of the solution and wherein said three phases of resultant materials comprise a gas-phase product containing the gas-forming material originally dissolved in the solute/solvent solution starting material and vapors of the solvent, a portion of which flow into the second vessel, a liquid-phase product having a solute concentration greater than the initial concentration of the solute/solvent solution starting material and a solid phase (of the solvent or of the solute); (6) collecting at least one of the three phases of resultant materials as a product of the process; (7) collecting at least a portion of the gas-phase product for reuse in the process; and (8) recycling at least one of the three phases of resultant materials back into an earlier stage of the process via a heat exchanger that heat exchanges a relatively cold resultant material with a relatively warm solute/solvent solution.

Applicants' three-phase separation processes can be augmented in any number of ways to improve their overall technical and economic efficiency. For example, such augmented processes can be the above-described process wherein: (a) the gas-forming material is liquid carbon dioxide, (b) the gas-forming material is gaseous carbon dioxide (c) the liquid in the pressure vessel is a single-phase liquid, (d) an additional portion of a gas-forming material (e.g., liquid $CO_2$) is introduced into the liquid while it is in the pressure vessel, (e) the second vessel is under a pressure greater than atmospheric pressure, but less than the nominal high pressure, when it receives vapors resulting from the J-T free expansion from the pressure vessel, (f) the second vessel is under atmospheric pressure when it receives vapors resulting from the J-T free expansion from the pressure vessel, (g) the second vessel is under a vacuum pressure when it receives vapors resulting from the J-T free expansion from the pressure vessel, (h) the second vessel is under vacuum pressure ("negative" pressure) when it receives vapors resulting from the J-T free expansion from the pressure vessel and wherein said vacuum pressure is supplied by the action of a jet eductor, (i) the vapors in the second vessel are introduced into the solute/solvent solution by a suction action supplied by a jet eductor, (j) an incoming solvent solution is heat exchanged against colder liquids created by a J-T free expansion of the process before the incoming solution is delivered to the pressure vessel, (k) the pressure vessel is a part of a battery of pressure vessels such that one pressure vessel can be filled while another pressure vessel is being emptied, (1) the pressure vessel is connected to a second vessel that also is used by other pressure vessels to collect vapors produced by the J-T free expansion, (m) the lowering of the temperature of the dissolved gas/solute/solvent solution to a jumping off temperature is done in at least two stages wherein the first stage involves heat exchanging said solution against a heat sink, (n) the lowering of the temperature of the dissolved gas/solute/solvent solution to a jumping off temperature is done in at least two stages wherein the first stage involves heat exchanging said solution against a heat sink comprised of a body of water from which the initial solute/solvent solution is drawn, (o) the solute/solvent solution starting material is seawater, (p) the liquid is a potassium sulfate solution obtained as a by-product of a cement manufacturing process, (q) the solute/solvent solution starting material is an aqueous solution containing dissolved minerals and the solid-phase product is ice that is thereafter melted and used in the production of a carbonated beverage, (r) the solute/solvent solution starting material is a nonaqueous industrial waste fluid, (s) the solution is a brine of nearly eutectic solute concentration from which magnesium carbonate is recovered, (t) a quantity of the liquid-phase product containing a solute concentration greater than the initial concentration of the solute/solvent solution starting material is recycled to an earlier stage of the process as a constant recycle quantity of said liquid-phase product, (u) the liquid-phase product is subjected to a blow-down procedure and a product of said blow-down procedure is recycled back to an earlier stage of the process as a constant recycle quantity of said product and (v) the liquid-phase product is separated into a constant recycle quantity and a remaining blow-down quantity composed of the starting material total solute and the unsolidified liquid remainder of starting material solvent in proportions up to and approaching eutectic (solubility) composition of the starting solute/solvent solution.

Expressed in patent claim language, one particularly preferred embodiment of these processes involving recycling the liquid-phase product will comprise: (1) combining a solute/solvent solution with a constant recycle quantity of a liquid product of increased solute concentration obtained from a J-T free expansion step of this process and used as a circulating inventory of said liquid product of increased solute concentration that is recycled in an amount adjusted to control a solute concentration of a combined solution comprised of a portion of the solute/solvent solution and a portion of the liquid product of increased solute concentration, (2) dissolving into said combined solution a controlled amount of a gas-forming material (e.g., $CO_2$), which will constitute a vapor phase at a system low temperature and pressure state that exists after the J-T free expansion step, to produce a gas-forming material/solute/solvent solution, (3) removing any heat of condensation arising from dissolving vapors of the gas-forming material and solvent into the combined solution by means of heat exchange with a heat sink, (4) removing sensible heat from the solution to approach a jumping off temperature, (5) placing the solution in a pressure vessel, (6) bringing the pressure vessel to some nominal high pressure, (7) rapidly releasing the nominal high pressure and thereby allowing substantially all of the gas-forming material and a minor portion of the solvent to form vapors that undergo a J-T free expansion into another closed vessel (a flashing vessel) having a nominal system low pressure and thereby obtaining three phases of resultant materials, which each have a temperature approximating the triple point temperature of the single-phase liquid and wherein said three phases of resultant materials comprise: a gas-phase product containing the gas-forming material originally dissolved in the solute/solvent solution starting material and vapors of the solvent (e.g., steam when water is the solvent), a major portion of which flows into the second vessel, a liquid-phase product having a solute concentration greater than the initial concentration of the solute/solvent solution starting material, most of which remains in the pressure vessel, and a solid-phase product (e.g., ice) of "pure" solvent (but for surface contamination), (8) collecting at least one of the three phases of resultant materials as a product of the process, (9) collecting at least a portion of the gas phase, (10) recycling at least one of the three phases of resultant materials back into an earlier stage of the process via a heat exchange procedure, and (11) separating the liquid phase into a constant recycle quantity and a remaining blowdown quantity composed of total solute of the starting material and unsolidified remaining solvent of the starting material in proportions up to and approaching the eutectic (solubility) proportion of the starting material solute and solvent.

Some of the herein disclosed processes can even be especially adapted to recover a solid-phase solute product (e.g., precipitated salt particles) from a solute/solvent starting material (as opposed to recovering a solid form of the solvent (e.g., ice). For example, a salt such as magnesium carbonate or sodium chloride can be recovered from seawater as a solid-phase product of the herein disclosed processes. That is, solutes in the form of solid-phase products can be obtained as a result of using appropriate solute concentration, temperature and/or pressure conditions going into applicants' J-T free expansion step. Generally speaking, the formation of a solid-phase solute product (e.g., solid-phase, salt particles), rather than a solid-phase solvent product (e.g., ice), can be viewed as increasing a weaker than eutectic concentration of the starting material component by solidification and removal of the purified starting material component originally present in excess of eutectic composition. When this principle is applied to a saturated solution being cooled to super-saturation, the result will be precipitation of excess solute. Thereafter, the entire liquid phase, approaching eutectic composition, is preferably, returned to a reservoir of the starting material.

Expressed in patent claim language, one general process falling under the teachings of this patent disclosure focusing on separating a solid-phase solute (e.g., a salt, in particule form) from a solute/solvent solution starting material would generally comprise: (1) dissolving into a solute/solvent solution a controlled amount of a gas-forming material, e.g., carbon dioxide (which will constitute a vapor phase at a system low temperature and pressure state that will exist after a J-T free expansion step of this process), to produce a gas-forming material/solute/solvent solution; (2) lowering the temperature of the gas-forming material/solute/solvent solution to a jumping off temperature to produce a liquid solution having a solute concentration, temperature and nominal high pressure that are such that a release of a nominal high pressure from said liquid solution to a nominal low pressure will result in production of a solid-liquid-gas equilibrium state (triple point) of the liquid solution and that is further characterized by production of a solid-phase product comprised of substantially "pure" solute; (3) placing the gas-forming material/solute/solvent solution under a nominal high pressure in a pressure vessel; (4) subjecting the vapors of the gas-forming material and water vapor that evolve from the solution as a result of rapidly lowering the pressure on the liquid to a Joule-Thompson free expansion caused by rapidly releasing the pressure on the vessel holding the solution from its nominal high pressure to a nominal low pressure of a second closed vessel and thereby: (a) producing a solid-liquid-gas equilibrium state (triple point) of the single-phase liquid solution that is characterized by its ability, upon initiation of applicants' J-T free expansion, to produce a solid-phase product comprised of substantially pure solute (but for surface contamination by the liquid-phase product), (b) evaporization of a major portion of the gas-forming material and a minor portion of the solvent as vapors that take their respective heats of vaporization in amounts such that the temperature of an entire mass of the liquid solution is lowered to approximate a triple point temperature that approaches the eutectic temperature of the liquid solution, (c) evolving a portion of the solute as a pure solid-phase product (e.g., a precipitated salt) and (d) forming a liquid product composed of the solvent of the starting material and any remaining solute (e.g., a brine containing any solute not contained in the pure, solid-phase solute product) and (5) separating the pure solid-phase product from the liquid-phase product.

It should be noted that in these "solute recovery" embodiments, the solid-phase product will not have a solute concentration substantially less than the initial concentration of the solute/solvent solution starting material, but rather, because of solute concentration, temperature and/or pressure adjustments to the liquid, the solid-phase product will be a substantially pure, solid-phase solute that is precipitated from the liquid-phase product as a result of said single-phase liquid undergoing the J-T free expansion.

Regardless of the nature of the end products of the above-described processes, those solute/solvent separation procedures that take place after applicants' J-T free expansion step will usually begin by emptying the contents of the pressure vessel. Preferably, this is done by draining the pressure vessel from its bottom; however, a floating ice product also may be harvested from the top surface of the brine contained in the vessel. In either case, a pure solid-phase product (e.g., ice or salt particles) might be regarded as the "end product" of a given process. After the solid-phase solute product is removed from the pressure vessel, the liquid phase product (e.g., brine) can be returned to an earlier stage of applicants' processes for heat exchange duties and then either returned for reintroduction into a portion of incoming raw feed material (e.g., incoming seawater) or removed entirely from the system. The return of the liquid-phase product also may be accompanied those blow-down procedures previously noted in this patent disclosure.

As was previously noted, the processes of this patent disclosure are particularly well suited for producing potable water from the aqueous solvent component (i.e., pure water) of seawater. But it also should be strongly emphasized that the herein disclosed processes can be readily employed to recover the salt components of seawater as their primary "product(s)." For example, some of the more common elements found in seawater that can be recovered by applicants' process could include:

| Element | Concentration in Seawater (mg/l) = ppm |
|---|---|
| Sodium | $1.05 \times 10^4$ |
| Magnesium | $1.35 \times 10^3$ |

Thus, the herein disclosed processes can be readily used to recover either or both of these elements from seawater; but they are particularly well suited to the recovery of the more valuable magnesium component since magnesium carbonate will precipitate out of a $CO_2$/seawater solution before sodium chloride. Such magnesium can of course be used in the form of the salt in which it is recovered (e.g., magnesium carbonate), or the salt can be subsequently converted to its metal form. That is, magnesium, which heretofore has been precipitated from seawater as its hydroxide by mixing dolomite with a portion of seawater, may be recovered by applicants' process, preferably as its carbonate, which is used to ultimately recover magnesium metal by known electrolytic techniques that convert magnesium chloride to magnesium metal. Hence, applicants' process can simultaneously produce potable water and a liquid-phase product having an increased solute concentration that is rich in magnesium. Those skilled in the chemical arts also will appreciate that such solid-phase products will be "pure," but will be (as in production of a solid-phase solvent such as ice) contaminated by surface brine. Such surface contamination of solutes can be removed by washing, precipitation and/or centrifugation processes well known to these arts.

Moreover, a solid-phase product may even result (or be forced to result) from certain chemical reactions resulting from the physical procedures employed in applicants' processes, e.g., the addition of a pressurizing gas. Production of insoluble carbonates, sulfates or sulfites would be examples of such variations of the herein described processes. In much the same vein, a solid-phase product of the solute may appear or disappear (or be forced to appear or disappear) due to physical activities taking place during the severe temperature changes inherent in these processes. For example, equilibria changes between carbonates and bicarbonates or sulfites and bisulfites, etc., can be forced by temperature changes. Also, applicants' separation process can be accomplished in any quantity proportions of liquid solutions of any net remaining ingredients when the process is halted at some temperature that is appropriate to some predetermined solute/solvent concentration of the initial feed material. One particularly useful variation of such procedures is the concept of circulation of a concentrated soluble carbonate in equilibrium with its bicarbonate as a means of introducing, pressurizing and conveying carbon dioxide to the system. Use of this concept constitutes an especially effective means of controlled precipitation of certain pure, and valuable, insoluble carbonates of calcium, magnesium, etc. Note also that in the particular case of chlorination of potable water, seawater and the like, or in cleaning up certain objectional by-products of cement plants, etc., chlorine and certain hypochlorites of sodium, calcium and/or magnesium may be removed by employment of such versions of applicants' fundamental processes.

Furthermore, even though applicants' processes are primarily exemplified in this patent disclosure by their use in obtaining potable water from seawater, such processes also can be readily employed to obtain "pure" water from mineralized fresh water (i.e., "hard" water). Consequently, "hard" or brackish water from non-seawater sources (e.g., water taken from "fresh" water sources) may be subjected to the herein described processes to obtain: drinking water, irrigation water, carbonated water or water for production of other carbonated beverages such as soft drinks, beer and the like. The degree of "purity" of such waters will of course vary with the intended end purposes. For example, the U.S. Public Health Service has established that water for human consumption should contain no more than 500 parts per million (ppm) of dissolved solids. On the other hand, the purity of irrigation water may vary widely with the crop species and soil conditions; e.g., in some cases irrigation water may contain as high as 1,200 ppm of solids without adversely affecting certain crops.

It also should be emphasized that the herein disclosed process can be used to recover solvents and/or solutes from industrial processes where water potability is not a necessary attribute of a water end product of that industrial process. Thus, sulfur dioxide could be used in place of carbon dioxide since "potability" is not a necessary attribute of the water end product. Applicants' processes can also be used in industrial processes using polar solvents other than water (e.g., alcohols). Such processes can also be employed to remove dissolved solutes from non-polar liquids such as aromatic hydrocarbons, aliphatics esters, ethers, ketones, amines, nitrated and/or chlorinated hydrocarbons, phosphates, liquid sulfur dioxide, etc. Yet another example of the use of applicants' process in an industrial and/or pollution control context would be in conditioning sludges and hydrophilic colloids, for, say, facilitating dehydration operations. In such cases, applicants' process would normally be used as a distinct step or part of such sewage treatment and/or water pollution control processes.

As a further example of the potential industrial uses of the herein disclosed processes, various embodiments of this process may be used to great advantage to recover dissolved salts from various industrial by-product fluids such as those released from pulping mills, cement factories, public utilities and the like. For example, in one highly preferred embodiment of this invention, where water is used as the solvent, but where its "potability" is not an issue, aqueous potassium compound solutions (e.g., sulfate or "potash" solutions), which are obtained from washing stack gases of cement kilns, can be treated by the herein disclosed processes to concentrate a sulfate solute that they often contain. This is an important application for these processes because this form of "potash" has heretofore only been recovered by prior art separation methods in extremely dilute concentrations. Applicants' process can improve upon this situation by providing a way in which the potash can be concentrated to a point where it can be sold as a commercial product or at least more economically handled (by concentrating it) for disposal purposes.

The processes disclosed herein may be used over a very wide range of easily attainable temperatures and pressures to separate very small or very large quantities of solute from various solutions. For example, relatively low operating pressures (e.g., 2 to 10 atmospheres) are generally preferred as nominal high pressures simply because they make lower demands on the equipment used and/or on the power requirements needed to perform the herein described processes. For example, viability of applicants' relatively mild pressure, temperature and $CO_2$ concentration requirements are well illustrated by the fact that for most aqueous solutions, the herein disclosed processes can be done using only: (1) nominal high pressures ranging from only about 20 psig to about 100 psig; (2) nominal low pressures such as those at, or just above, atmospheric pressure in the second or flashing vessel (indeed, pressures below atmospheric pressure, e.g., those vacuum conditions created by the jet eductors used to recycle the $CO_2$ vapor) can be used; (3) small amounts of gas-forming materials, e.g., about 3.5 gas volumes of carbon dioxide per liquid volume of solution for aqueous solutions containing from about 2 percent to about 25 percent solute concentrations by weight and (4) eutectic temperatures in the neighborhood of about 26° F. for many salt/water solutions such as, for example, seawater. Application of such conditions in applicants' processes will usually produce ice in amounts ranging from about one-tenth to about one-half the volume of the solution. More extreme operating conditions (e.g., use of greater nominal high pressures and/or lower nominal low pressures [e.g., vacuum levels from 1 to about 25 feet of vacuum head can be produced by commercially available jet eductors] may be used to produce greater process efficiencies—so long as the cost of attaining the more extreme operating pressure conditions does not become prohibitive.

One of the most preferred embodiments of this invention will involve recycling the vapor phase products of these processes (e.g., $CO_2$ vapor and water vapor) by educting them (in their combined vapor phase) back into the solute/solvent solution starting material. Such injection should be done before said solution attains its hereinafter described "brink" or "jumping off" temperature. Certain jet eductor systems (hereinafter more fully described) can provide a very convenient means of introducing such vapor-phase materials back into the solute/solvent solution. Such vapor-phase materials may also be reintroduced by various combinations of reintroduction procedures (e.g., jet eduction of the vapor products of these processes or injection of liquid gas-forming materials that have been produced from such vapors by mechanical recompression means). Liquid $CO_2$ can be conveniently introduced at the pressure vessel as part of any final adjustments that may need to be made to create an appropriate liquid (especially a single-phase, composite liquid) at the desired jumping off temperature, pressure and solute concentration conditions.

However, if carbon dioxide and water vapor products are reintroduced into the incoming solute/solvent solution (e.g., seawater) in their vapor forms (and therefore carrying their respective heats of vaporization), a specific first heat exchange step (as opposed to incidental heat losses experienced by the vapors when they are en route to the jet eductor) normally will be performed on the solution. Most preferably, this first heat exchange step will be performed against a heat sink such as the body of water from which the working fluid (e.g., seawater) is drawn. Again, this heat exchange requirement follows from the fact that eduction of the $CO_2$ vapor and water vapor into a feed stream of solute/solvent solution implies that the $CO_2$ and water vapors will give up their heats of condensation to the solution and thereby raise that solution's temperature. This raised temperature would eventually have adverse effects on the hereinafter described heat exchange(s) between the relatively "warm" incoming solute/solvent solution and the relatively "cold" products (e.g., ice, brine) of the three-phase separation (i.e., the temperature of the cold stream and the warm stream would get closer and closer to each other, and thus, applicants' heat exchange steps would become less and less effective). Consequently, in the most preferred embodiments of this invention, an incoming feed solution that has been heated by absorption of the heat of condensation of $CO_2$, water vapor, etc., is preferably heat exchanged against a "heat sink"—and especially one that is completely "external" to the hereinafter described "internal" heat exchange (i.e., heat exchanges done against the products of applicants' J-T free expansion). In seawater purification processes, the body of seawater from which the incoming solute/solvent solution is being drawn also can conveniently serve as a "heat sink."

It is also contemplated that production of certain products by the herein disclosed processes may affect or even dictate the choice of the point of introduction of a given material into applicants' processes. This choice of point of introduction may, in turn, affect the composition of a particular receiving fluid, e.g., raw feed, circulating brine, recycle and/or combined fluid feeds, etc. It is also contemplated that the conditions of a given introduction, and of a given removal, of the gaseous and solid phases can constitute a specific feature chosen for some specific application of the process. Indeed, the only absolute limitation on the return of such process-produced materials is that such returns should be accomplished before the J-T free expansion takes place in the pressure vessel, that is, before the liquid in the pressure vessel attains a certain hereinafter more fully described "jumping off" temperature, needed to produce a three-phase separation by applicants' J-T free expansion step.

DESCRIPTION OF CERTAIN PREFERRED EMBODIMENTS

Theoretical Considerations

Figure 1:
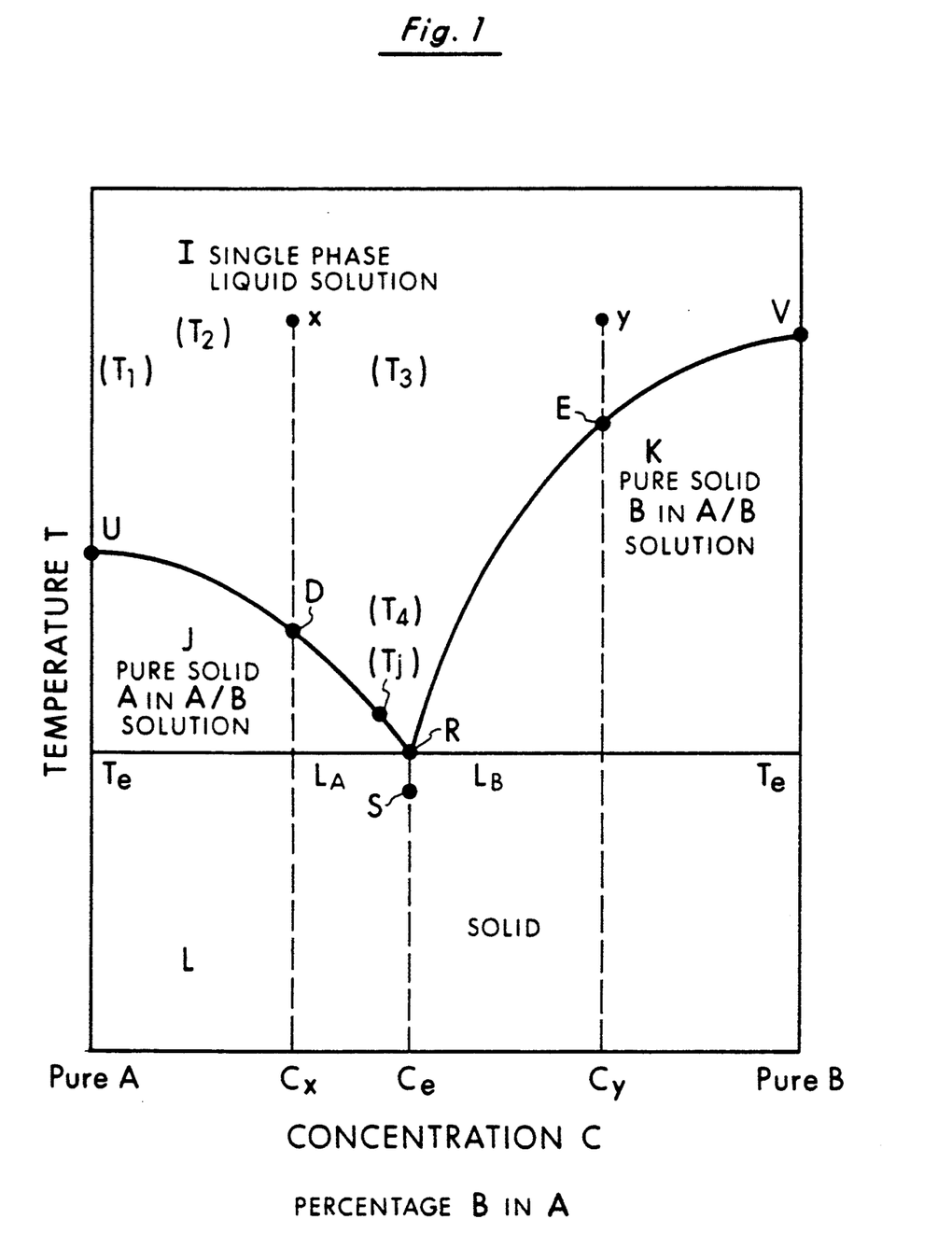
FIG. 1 depicts a temperature-phase relationship diagram of a single solute, single solvent system. It particularly illustrates certain key operating conditions that occur during the Joule-Thompson free expansion step of the herein disclosed processes.

FIG. 1 graphs the behavior of a typical single-species solute in a typical single-species solvent. In effect, this graph depicts a temperature-phase relationship of solubility and melting point over a range of total compositional proportions extending well to either side of that particular solubility corresponding to the eutectic composition (solubility) at the minimum total freezing point of the solution. Those skilled in this art will appreciate that compositions of this type also must satisfy the governing thermodynamic phase-composition relationships typified by such a solubility (eutectic) diagram. The phase equilibrium regions shown in FIG. 1 also can be related to Gibbs' "phase rule," which dictates that the number of freely variable conditions ("degrees of freedom") plus the number of phases must equal the number of components, plus two. The "degrees of freedom" can be temperature and/or pressure and/or compositional variables that amount to the number of components, minus one. The phases can be one gas phase, any number of liquid phases that are discrete (i.e., that do not dissolve in each other) and any number of solid phases so long as one does not constitute a continuous phase.

In FIG. 1, temperature is shown as the graph's ordinate. The concentration (weight percent) of the solute in the total liquid solution is shown as its abscissa. Various regions on this graph are delineated by lines and pertain to phase-composition behavior typical of that region. For example, such regions can be depicted by two lines, an upper line formed by the intersection of two arcs (U-R and V-R) which are shown meeting at a sharp notch point R at $T_e$ and $C_e$, (the "eutectic" temperature and composition) and a lower horizontal line ($T_e$—$T_e$) that depicts the eutectic temperature of the solution. By way of example only, the eutectic temperature $T_e$ of a 3 percent sodium chloride solution will be about 26° F. A lower horizontal line ($T_3$—$T_3$) is shown passing through point R and depicts a borderline for the complete range of compositions at $T_e$. It is, in effect, the ultimate total freezing point reached for the total beginning liquid composition. The notched curve URV also forms a lower borderline of initial precipitation of solids from the total liquid. Thus, region I represents a single-phase liquid at all compositions. The liquid phase is depicted as having some temperature $T_1$.

Next, such a two-component solution at point X represents a particular composition of solute at less than the eutectic composition. As the solution cools, its composition remains constant until it reaches its boundary arc line (U-R) as depicted by point D. There, pure solvent will begin to freeze, thereby precipitating pure solid solvent in the remaining liquid. The latter's composition, being solute until it reaches $C_e$ and $T_e$, whereupon the whole mass enriched by removal of solid solvent, follows the arc U-R in compositions relating to the degree of cooling freezes.

Conversely, consider point Y at a composition richer in solute than it is at $C_e$. In an analogous manner, upon reaching its arc line (V-R), as depicted by point E, pure solid solute begins to precipitate, thereby leaving the solution progressively more dilute as the process follows the arc (V-R) relating composition through succeeding lower temperatures. This continues until the material reaches temperature $T_e$, whereupon the remaining liquid at the eutectic composition totally freezes to a solid.

Region I therefore depicts an entirely single-phase liquid; region J depicts a liquid mixed with solid precipitated solvent; region K represents liquid mixed with solid precipitated solute; and region L represents total two-phase solid (except for a single solid phase at the unique situation of starting with single-phase liquid and ending with single-phase solid, but always at eutectic composition). In subregion $L_A$, a continuous solid phase at $C_e$ contains inclusions of solid pure solvent, while, on the other hand, sub-region $L_B$ contains a discontinuous phase of solid solute inclusions.

Next, FIG. 1 also should be understood to make no intrinsic difference in the behavior of either of the solution components. That is, there should not be construed any functional distinction implied by the terms "solvent" and "solute." In such a two-component solution, either component of the starting material present in excess of its eutectic concentration will selectively separate as a solid phase with the remaining liquid phase increasing to eutectic concentration as the mass of the solution is cooled to its phase boundary curve (U-R) and thence to $T_e$ at $C_e$. Bearing this in mind, it will be appreciated that depending on the conditions of concentration, temperature and pressure used—the herein disclosed processes can be used to precipitate a solid-phase product that is a solid form of the solvent (e.g., ice); or these processes can just as well be used to precipitate a solid-phase product that is a solid form of the solute (a solid salt, e.g., magnesium carbonate from seawater) that precipitates from a saturated solution of the solvent as a result of applicant's Joule-Thompson (J-T) free expansion of a single phase liquid solution that is properly prepared as to composition, temperature and pressure to effect the precipitation of a solid solute product.

With respect to temperature, the preparations described in this patent disclosure generally involve lowering the temperature of a solute/solvent solution from some initial temperature $T_1$ (e.g., seawater at 68° F.) to a "jumping off" temperature $T_j$ that lies just above the triple point temperature $T_e$ of the solution. Again, by way of example only, the $T_j$ for a 3 percent sodium chloride/water solution (which roughly approximates the salt concentration of seawater) would be just above its $T_e$ of about 26° F. This lowering of temperature from $T_1$ (68° F.) to $T_j$ (26° F.) will normally be via temperatures $T_2$, $T_3$ and $T_4$, etc., which are attained as the solution undergoes the various heating and heat exchange steps described in this patent disclosure.

For example, in those versions of this invention wherein a gas (rather than a liquid) is originally introduced into an incoming solute/solvent solution having an original temperature $T_1$, a first "deliberate" heat exchange should be performed on the solution resulting from dissolving $CO_2$ vapor into a portion of the incoming solute/solvent solution. This is done to remove at least a portion of (and preferably most of, and most preferably all of) the heats of condensation and/or solution of the dissolved gases (e.g., $CO_2$+water vapor) that are imparted to the solution in which the gases are dissolved and that raise the temperature of the incoming solute/solvent solution from its initial temperature $T_1$ to some higher temperature $T_2$ (e.g., from 68° F. to 70° F.).

In effect, the first heat exchange serves to bring the temperature of the solution back to some temperature $T_3$ that most preferably approximates the temperature $T_1$ of the incoming solute/solvent before it was heated by dissolving $CO_2$ and water vapor therein. Again, the need for such an initial heat exchange might be mitigated or even negated by heat losses incurred by the $CO_2$ and water vapor during their trip from the second vessel (flashing vessel) to the jet eductor used to reintroduce the $CO_2$ vapor into the feed stream (incoming seawater), but these kinds of incidental heat losses will not normally suffice and hence, a first, and most preferably, external heat exchange will normally be used. This first heat exchange might be done against any "excess" refrigeration produced by this process, but such an "internal" heat exchange is less preferred.

On the other hand, introduction of a gas-forming material that is in a liquid state, e.g., introduction of liquid carbon dioxide, will serve to lower the temperature of an incoming solution owing to the fact that "heat" is taken away from the solution as a result of dissolving liquid $CO_2$ into said solution (whereupon the liquid will "flash"). In any case, some degree of "control" over the location of temperature $T_1$ in FIG. 1 can be achieved by controlled use of the thermodynamically opposed phenomena occurring when liquid $CO_2$, rather than gaseous $CO_2$, is introduced into an incoming solution.

In some very special cases introduction of sufficient quantities of a liquid, gas-forming material, such as liquid carbon dioxide, may even drive the temperature of the resulting $CO_2$/solute/solvent solution all the way from $T_1$ to that jumping off temperature $T_j$ needed to fully prepare said solution for applicants' J-T free expansion step. In most cases, though, another kind of distinct heat exchange procedure will be needed for the solution to attain its jumping off temperature $T_j$. This other cooling or heat exchange step is most preferably done "internally" by cooling the incoming stream of "warm" solute/solvent solution against the "cold" products (e.g., brine and melted ice) of applicants' J-T free expansion step. In effect, this internal heat exchange serves to lower the temperature of the solute/solvent solution from some initial temperature $T_1$ (or $T_3$ as the case may be) to some temperature $T_j$ that lies just above the total system's freezing temperature $T_e$. This degree of chilling might also be described as the amount of refrigeration necessary for a given amount of the solution to "almost" reach its "eutectic temperature" after dropping below the triple point temperature of the system's pure solvent component (e.g., below the triple point of pure water).

Thereafter, the solute/solvent solution is delivered to a pressure vessel where final adjustments (if any are needed) to the temperature of the solution may be made to bring it closer to $T_j$. Introduction of liquid $CO_2$ into the pressure vessel could be made to make such temperature adjustments, as well as to introduce more carbon dioxide into the solution before the J-T free expansion step is initiated. Thereafter, the working fluid resulting from such procedures is subjected to a J-T free expansion to induce a three-phase separation and thereby form a solid-phase product, a liquid-phase product and a vapor-phase product, and hence provide a means by which the solute component of the original solute/solvent solution can be separated from its solvent component.

Again, most preferably, the solute/solvent solution residing in the pressure vessel just before the J-T free expansion will be a single-phase composite liquid. This preference for a single-phase composite liquid implies that there be no appreciable amounts of gas bubbles, colloidal matter or solid particles in the composite liquid just before the J-T free expansion step.

The J-T free expansion can be initiated by quickly opening a valve between the pressure vessel and the flashing vessel. The J-T free expansion step is performed at a temperature $T_j$ that is carefully contrived to permit an adiabatic expansion of vapor products into a flashing tank when the nominal high pressure in the pressure vessel is lowered to the nominal low pressure in the flashing tank. This, in turn, produces a system low temperature that just approaches—note once more the location of point $T_j$ in FIG. 1—the eutectic temperature T, of the solution. Thus, the temperature, pressure and solute concentration conditions forced upon the solution just before applicants' J-T free expansion are such that a gas phase, a liquid phase and a solid phase (i.e., ice or salt particles) each must result from the irreversible adiabatic expansion (i.e., the J-T free expansion) of the vapor products from the pressure vessel to the flashing tank.

Those skilled in this art will appreciate that production of only two phases will not constitute a "successful" outcome for the herein described processes. In other words, this requirement for the production of three phases necessarily relates a certain temperature and a certain pressure and certain solute concentrations for a "triple point," which is thus completely determined when all compositional options implicit in Gibbs' phase rule (i.e., the degrees of freedom plus the number of phases must equal the number of components plus two) have been used up. In applicants' process, there are no degrees of freedom remaining "downstream" of the irreversible adiabatic expansion. However, at the pressure vessel end of applicant's J-T free expansion, there is a degree of freedom, since applicants' process "contrives" (e.g., by temperature adjustment) to have only a single-phase liquid present at the jumping off point in the process. In other words, since the pressure is set (e.g., at the system's nominal high pressure) and the composition of the materials used is likewise set, and since the gas quantity will be set to a given level by the adiabatic energy balance requirements, there can be only one degree of freedom remaining, namely, the temperature of the single-phase liquid solution. Again, for the purposes of this patent disclosure, this temperature is often referred to as the "jumping off" or "brink" temperature $T_j$.

Practical Embodiment

Figure 2:
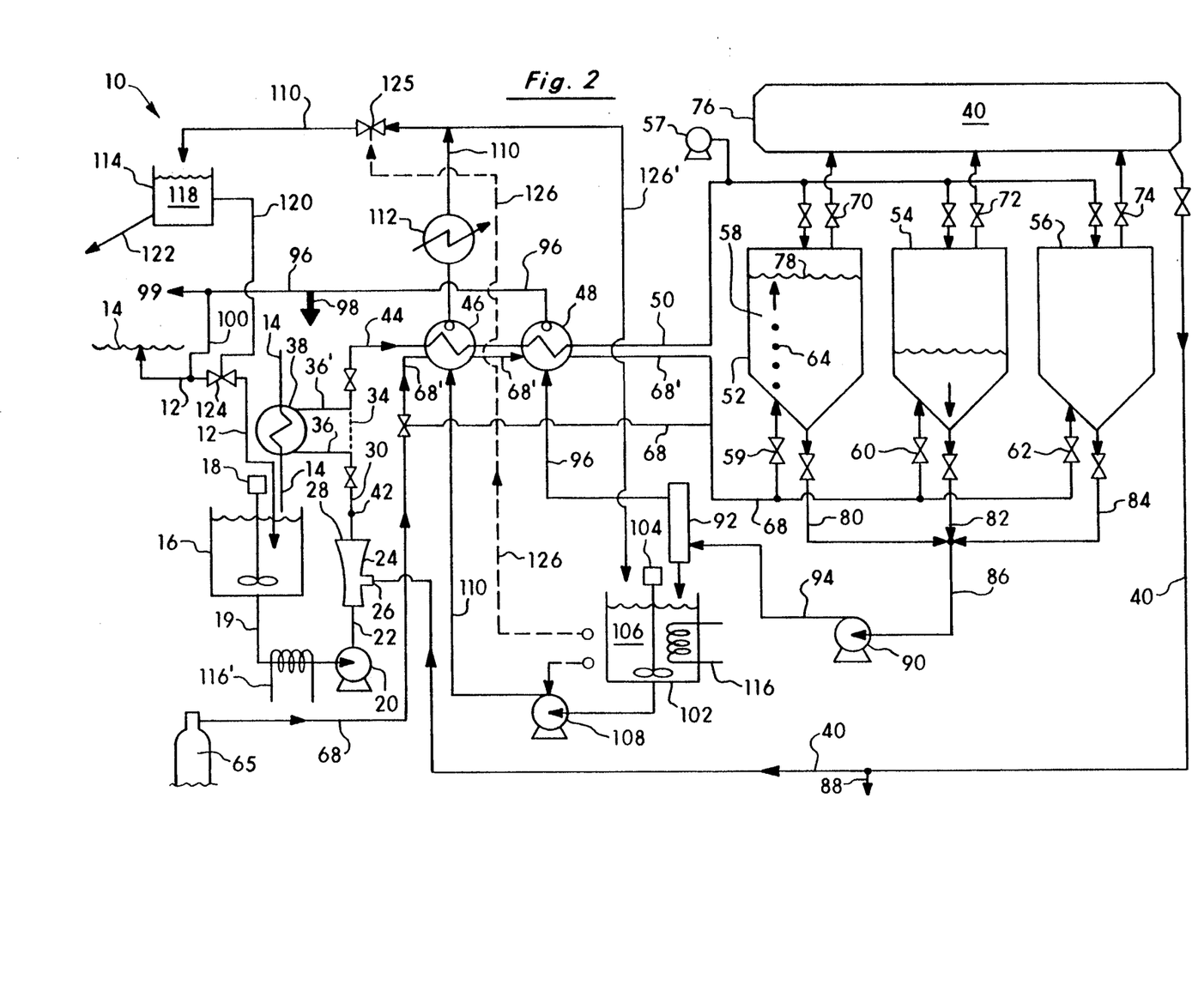
FIG. 2 depicts a process flow scheme for a preferred embodiment of the herein disclosed processes wherein more than one pressure vessel is employed to create a semi-batch system and wherein all of the pressure vessels use a common flashing vessel whose contents are collected and reused through action of a jet eductor.

FIG. 2 depicts how a preferred embodiment 10 of this process begins by obtaining a stream of solute/solvent solution 12 starting material (e.g., a brine feed such as seawater) that has some initial solute concentration (e.g., a 3 percent salt concentration) in a solvent (e.g., water) and some initial temperature $T_1$ (e.g., 68° F.). The starting material can be obtained from any suitable source 14 (e.g., a body of seawater, a body of other water or a stream of industrial waste fluid). A pump (not shown) can be readily used to obtain stream 12 of solute/solvent solution and to place it in a feed tank 16. Feed tank 16 may be (but need not be) supplied with an agitator 18 if mixing or agitation is needed for any reason.

Again, in some of the more highly preferred embodiments of this invention, the incoming stream of liquid feed material 12 may be mixed with a constant recycle quantity of a concentrated liquid product 100 (e.g., concentrated brine) derived from the Joule-Thompson (J-T) free expansion step of this particular process. Typically, this constant recycle quantity of concentrated liquid product will have a temperature that is less than the temperature of the incoming feed solution. Thus, the temperature of the solution resulting from mixing these two solutions will be less than that of the incoming feed solution (e.g., seawater).

In either case, a stream 19 of the solute/solvent solution is then forced—under pressure supplied by pump 20—as a motive stream 22 through a jet eductor 24 having a suction inlet port 26 and a motive stream exit port 28. The stream 30 exiting eductor 24 can be sent directly to a first "internal" (internal to the heat contained in the overall apparatus 10) heat exchanger 46 via direct line 34; or, more preferably, stream 30, at some temperature $T_2$ (e.g., 70° F.) that is higher than temperature $T_1$, may be sent (via line 36) to a heat exchanger 38 that is connected to a heat sink (e.g., connected to the body of water 14, at a $T_1$ of say 68° F., from which stream 12 is drawn). The flow of the motive stream 22 through the jet eductor 24 creates a vacuum at the suction inlet port 26 of the jet eductor 24. A vapor product 40 (e.g., $CO_2$ vapor and water vapor) of a J-T free expansion step of this process can thereby be drawn from flash tank 76 into the jet eductor's suction inlet port 26. Thus, the vapor product 40 of this process can be educted into, mixed with and dissolved into motive stream 22. In being so dissolved, vapor product 40 gives up its heat of condensation to motive stream 22 to produce a liquid stream 30 that exits jet eductor 24 at a temperature $T_2$ higher than $T_1$. Stream 30 is under a pressure that could be (but need not be) the system's nominal high pressure. In other words, the pressure of stream 30 could be used to provide pressure vessel 52 with the system's nominal high pressure.

At this point, note that the mechanical inefficiency of jet eductors will cause the pressure of stream 30 leaving jet eductor 24 to be considerably less than the pressure placed on motive fluid 22 by pump 20 as said motive fluid 22 enters jet eductor 24. Pressure losses of 20 percent to as high as even 95 percent are not uncommon in such jet eductors, depending on various operating parameters such as: the pressure supplied by the pump used, the level of suction or vacuum at suction inlet port 26 of eductor 24, the temperature of the solute/solvent solution, the temperature of the vapor 40 educted, the volume of solute/solvent solution, the volume of vapor educted, the viscosity of the various fluids, etc.

Those skilled in this art will of course appreciate that within the operating restrictions of a given system, known performances of commercially available jet eductors, for the inlet conditions of quantities, temperatures and pressures of motive and educted fluid, can be obtained from the manufacturer, or can be readily calculated. However, once obtained, this information then can be used to predict the outlet temperature and pressure of a given exit stream 30. Moreover, and more to the point of the herein disclosed processes, some desired temperature and pressure of liquid stream 30 can be used as a "design" basis or criterion for selection of the most appropriate eduction equipment in view of the values of the temperatures, pressures and quantities of the fluid materials fed into the eductor as the motive fluid and as the educted fluid (i.e., the vapor 40). That is, good design can serve to minimize the need to adjust the eductor's operating performance. Moreover, temperature sensor means 42 can serve to control which routes stream 30 will take (through external heat exchanger 38 or direct travel over line 34) in its journey to the next component of the system, internal heat exchanger 46.

Consequently, the resulting $CO_2$/solute/solvent solution stream 30 will normally be brought from a temperature $T_2$ to a lower temperature $T_3$ (which preferably approximates $T_1$) by cooling said stream 30 in heat exchange means 38. In other words, the solute/solvent solution exiting heat exchanger 38 via line 36' will be at temperature $T_3$. Again, heat exchange means 38 is most preferably provided with a "cold stream" drawn from the body of seawater 14 depicted in FIG. 2. Regardless of the source of cooling used, however, the resulting solution 44 leaving heat exchanger 38 should have lost a substantial portion of (if not all of) the heat of condensation of the gas-forming material 40 (e.g., $CO_2$ vapor) introduced into motive fluid stream 22.

In any case, the next important step in applicants' overall process is to cool stream 44 against one or more cold products of this process (e.g., against cold brine or melted ice products produced by the J-T free expansion). This is preferably done sequentially, in heat exchangers 46 and 48 in the manner depicted in FIG. 2. The resulting cold stream 50 (its temperature should now begin to approximate $T_j$) is then sent to a pressure vessel (e.g., pressure vessel 52, 54 or 56) that is to be filed by cold stream 50 via suitable valving means. As was previously noted, such an apparatus 10 will most preferably have more than one such pressure vessel in order to gain process time efficiencies such as those associated with draining or otherwise harvesting the contents of one such pressure vessel while another is being filled.

FIG. 2 depicts one of the pressure vessels (i.e., vessel 52) as being virtually filled by a body of liquid 58. By way of comparison, pressure vessel 54 is depicted as partially filled and pressure vessel 56 is depicted as being empty. If need be, final temperature and $CO_2$ gas concentration adjustments can be made on the body of liquid 58 in pressure vessel 52. Such adjustments may, among other things, serve to bring the liquid body 58 closer to its final "jumping off" or "brink" temperature, pressure and solute concentration conditions such that a sudden release of the nominal high pressure on the body of liquid 58 in vessel 52 will cause a J-T free expansion of the $CO_2$ vapor and water vapor to occur. This vaporization of a major portion of the dissolved $CO_2$ and a minor portion of water vapor will cause these materials to absorb their respective heats of vaporization in quantities such that their respective vaporizations lower the temperature of the entire mass of the body of liquid 58 to a temperature $T_j$ that approximates the triple point temperature $T_e$ of said liquid.

Next, note that for providing "adjustment" or "make up" $CO_2$ to the system, tanks 52, 54 and 56 are respectively provided with valve means (e.g., valves 59, 60 and 62) for delivering $CO_2$ to the bottom of each tank. The carbon dioxide delivered in this fashion will bubble up through the body of liquid 58 in a manner generally depicted by bubble column 64. These bubbles can be adjusted as to rate of introduction and bubble size (smaller bubbles are preferred because of their greater surface areas). The $CO_2$ so introduced is preferably obtained from a pressurized tank 65 of liquid $CO_2$. The contents of such tanks can be introduced directly via line 68 into pressure vessel 52 (whereupon "flashing" will occur, and bubbles 64 will be formed), or they can be sent via line 68' through heat exchangers 46 and/or 48 as indicated. Temperature sensor 78 means can be placed at any convenient point in the pressure vessel to monitor the brink temperature and/or to effect adjustments of said temperature by changing heat exchange paths of various feed materials (e.g., at heat exchangers 46 and 48, at $CO_2$ paths 68 and 68'), by introducing more or fewer $CO_2$ bubbles 64, by changing material quantities, etc.

If the various operating conditions of the process have been properly set and adjusted, a J-T free expansion of the $CO_2$ and water vapor through vent valve 70 will lower the temperature of the body of liquid 58 in pressure vessel 52 to a temperature that is near its triple point $T_e$, and thereby produce three distinct phases of material, each having a temperature near $T_j$: a solid phase (e.g., ice or solute particles), a brine phase and a vapor phase. Once formed, the ice will float to the surface of the body of liquid 58 from whence it can be mechanically collected. This can be done by skimming ice from the surface of the liquid, or most preferably, by draining the entire contents of vessel 52 via line 80 (which may be part of a larger draining system (e.g., including drainage lines 82, 84) that culminates in drainage line 86.

In any case, pressure vessel 52 (and/or pressure vessel 54, 56, etc.) is then brought to some final nominal high pressure (e.g., 3 atmospheres). Auxiliary pressure providing means 57 may be used for this purpose, or as previously noted, pump 20 also may be used to provide the pressurization needed to attain the nominal high pressure (e.g., 3 atmospheres) in pressure vessel 52. Most preferably, the liquid body 58 in such a vessel 52 will become a single-phase composite liquid before the J-T free expansion step is performed. That is, no solid phase (e.g., salt crystals) or gas phase (e.g., $CO_2$ bubbles 64) will be present in the liquid when the J-T free expansion is initiated. To this end, introduction of gas bubbles 64 is most preferably stopped before the J-T free expansion step is initiated.

The J-T free expansion is most preferably done by suddenly opening a vent valve (e.g., valve 70 of tank 52) leading from pressure vessel 52 to a second or "flashing" tank 76. The resulting pressure release produces a massive surge of carbon dioxide bubbles in pressure vessel 52. In effect, the carbon dioxide, which is in solution under the nominal high pressure, comes out of solution under the nominal low pressure produced by opening valve 70 and thereby causing $CO_2$ and water vapors to "flash" into tank 76. Tank 76 should of course be closed and have sufficient volume to receive a major part of the volume of the carbon dioxide vapor and water vapor produced under their then existing temperature, pressure and concentration conditions. The resulting mixture of these two vapors is designated as item 40 in the flash tank 76—as well as stream 40 when these vapors are pulled from tank 76 under the action of jet eductor 24.

The $CO_2$ vapor in tank 76 is easily reused through use of a jet eductor such as the jet eductor 24. As previously discussed, this mode of reusing the $CO_2$ vapor implies that the heats of condensation and solution of the gaseous $CO_2$ (or any other gas, such as $SO_2$, so used), would have to be removed from the solution into which it is dissolved. Again, this heat removal step could be accomplished through a separate heat exchange means with any low-temperature source. It could, for example, simply be cooled by heat exchange against an external source of refrigeration before the vapor stream 40 enters jet eductor 24. Also note in passing that some of the water vapor in stream 40 may even recondense during the trip from flash tank 76 back to jet eductor 24. If desired, this condensed water could be removed from the system, e.g., at the discharge arrow 88, by liquid discharge devices well known to the chemical engineering arts.

Next, note that FIG. 2 depicts drainage line 86 for carrying an ice/brine slurry from the bottom of the pressure vessels (e.g., vessel 52, 54 or 56) as being under the action of a pump 90. The pump 90 also delivers the ice/brine slurry taken from tank 52 to an ice separator 92 via line 94. The ice separator 92 separates the ice from the brine. The brine component is sent via line 96 through heat exchanger 48 as its "cold" stream. That is, cold stream 96 heat exchanges against the warmer stream 44 of incoming ("incoming" to pressure vessel 52) solution. As was previously noted, a portion of such a solution (e.g., brine) can be recycled back to some initial stage of this process (e.g., to stream 12) for recombination with a stream of feed material, e.g., it can be sent over line 100 and mixed with a new portion of the incoming stream 12 of solute/solvent solution. Thus, such a recycling can serve to provide compositional flexibility to enable an approach to saturation as a process adjustment technique. Liquid stream 96 also can be apportioned into at least two streams, a brine product portion 99 and a recycle portion 100 that is reintroduced into incoming stream 12. A recycle portion of stream 96 also can be removed from the system at some other location such as the point designated by discharge arrow 98. Such a removal could, for example, be carried out by a blow-down procedure of the type previously discussed. Indeed, in many instances a blowdown procedure also will be the most preferred technique for recycling brine back to some earlier stage of this process, e.g., to stream 12 via lines not shown in FIG. 2.

Stream 96 leading from ice separator 92 is shown being heat exchanged in heat exchanger 48 against the liquid stream 44 (and against carbon dioxide stream 68'). Since liquid stream 96 will initially have a temperature that approximates temperature $T_j$, which is significantly lower than the temperature of stream 44 flowing through heat exchanger 48, the two streams can be readily heat exchanged against each other. Ideally, the heat exchange in the last heat exchanger in a series of such heat exchangers (e.g., heat exchanger 48) will produce a resulting temperature in the liquid stream 50 flowing into pressure vessel 52 that approaches (or even constitutes) the brink or jumping off temperature $T_j$ previously discussed. To the extent this cannot be achieved, however, external sources of cold can be used and/or liquid gas (e.g., liquid $CO_2$ from tank 65) can be introduced to achieve a desired jumping off temperature $T_j$ in pressure vessel 52.

FIG. 2 also depicts how some or all of the solid-phase material (e.g., ice) can be taken from the separator means 92 (e.g., by a centrifugal densifier) and delivered to an ice melting tank 102 that preferably is supplied with a mixing means 104 such as an agitator. The centrifugal separation device 92 should effect a separation of the ice particles and brine in such a way as to maximize the ice content of the material delivered to tank 102. The more preferred centrifugal separation device for the practice of this invention will use the difference in specific gravity between the ice particles and solvent to maximize the amount of ice delivered to tank 106 and to minimize the brine associated with that ice. Be that as it may, a solid/liquid mixture 106 (e.g., an ice/water mixture) is maintained in tank 102 from which a liquid solvent (e.g., water) can be obtained. Moreover, a pump 108 can be used to send a stream 110 of such melted ice water from tank 102 and drive it through heat exchanger 46 and, optionally, through heat exchanger 112, before delivering this water to a "purified" product holding tank 114. In some preferred embodiments of this process, tank 102 also is fitted with a heat exchanger 116 whose "warm stream" is supplied by a feed stream such as stream 12 (as indicated by heat exchanger 116') both to melt the ice in tank 102 and to help cool feed stream 12.

A "purified" product 118 (e.g., "pure" water) in tank 114 may be collected as an end product via line 122, or sent to some internal use as indicated by line 120, or sent for further processing, which also can be depicted by arrow 122. For example, a portion of the "purified" product (e.g., water having a solute concentration less than that of the incoming solute/solvent solution) can be recycled back to various places in the process, e.g., to stream 12 via valve 124. Control of stream 110 can be achieved by any appropriate control system such as the one generally depicted by control loop 126.

Finally, it should be understood that the herein disclosed processes should in no way be limited to the examples and figures given above, but rather the full scope and spirit of this patent disclosure should only be limited by the claims that follow.

Thus having disclosed our invention, what is claimed is:

1. A process for separating a solute from a solvent which together constitute a solute/solvent solution starting material having an initial solute concentration, said process comprising:
   (1) dissolving a gas-forming material into the solute/solvent solution to produce a dissolved gas/solute/solvent solution;
   (2) lowering the temperature of the dissolved gas/solute/solvent solution to a jumping off temperature to produce a liquid having a solute concentration and temperature that are such that a release of a nominal high pressure on the solution to a nominal low pressure results in evaporation of a major portion of the gas-forming material as well as evaporation of a minor portion of the solvent as vapors that take their heats of vaporization in amounts such that the temperature of an entire mass of the solution is lowered to a temperature that approximates the triple point temperature of said solution;
   (3) placing the solution in a pressure vessel;
   (4) bringing the solution in the pressure vessel to the nominal high pressure;
   (5) rapidly releasing the nominal high pressure and thereby allowing a major portion of the gas-forming material and a minor portion of the solvent to form vapors that undergo a Joule-Thompson free expansion into a closed second vessel having a nominal low pressure and thereby obtaining three phases of resultant materials that each have a temperature approximating the triple point temperature of the solution and wherein said three phases of resultant materials comprise a gas-phase product containing the gas-forming material originally dissolved in the solute/solvent solution starting material and vapors of the solvent, a portion of which flow into the second vessel, a liquid-phase product having a solute concentration greater than the initial concentration of the solute/solvent solution starting material and a solid-phase form of the solvent;
   (6) collecting at least one of the three phases of resultant materials as a product of the process;
   (7) collecting at least a portion of the gas-phase product for reuse in the process; and
   (8) recycling at least one of the three phases of resultant materials back into an earlier stage of the process via a heat exchanger that heat exchanges a relatively cold resultant material with a relatively warm solute/solvent solution.

2. The process of claim 1 wherein the gas-forming material is liquid carbon dioxide.

3. The process of claim 1 wherein the gas-forming material is gaseous carbon dioxide.

4. The process of claim 1 wherein the solution in the pressure vessel is a single-phase liquid.

5. The process of claim 1 wherein an additional portion of a gas-forming material is introduced into the solution while it is in the pressure vessel.

6. The process of claim 1 wherein the second vessel is under a pressure greater than atmospheric pressure, but less than the nominal high pressure, when it receives vapors resulting from the Joule-Thompson free expansion.

7. The process of claim 1 wherein the second vessel is under atmospheric pressure when it receives vapors resulting from the Joule-Thompson free expansion.

8. The process of claim 1 wherein the second vessel is under a vacuum pressure when it receives vapors resulting from the Joule-Thompson free expansion.

9. The process of claim 1 wherein the second vessel is under a vacuum pressure originally supplied by a jet eductor when said second vessel receives vapors resulting from the Joule-Thompson free expansion.

10. The process of claim 1 wherein the gas phase product in the second vessel is introduced into the solute/solvent solution by a suction action supplied by a jet eductor.

11. The process of claim 1 wherein an incoming portion of the solute/solvent solution liquid is heat exchanged against two or more cold materials created by a Joule-Thompson free expansion of the process, before said solution is delivered to the pressure vessel.

12. The process of claim 1 wherein the pressure vessel is a part of a battery of pressure vessels such that the pressure vessel can be filled while another pressure vessel is being emptied.

13. The process of claim 1 wherein the pressure vessel is connected to a second vessel that is also used by other pressure vessels to collect vapor products produced by Joule-Thompson free expansions performed in the other pressure vessels.

14. The process of claim 1 wherein the lowering of the temperature of the solute/solvent solution to a jumping off temperature is done in at least two stages and wherein the first stage involves heat exchanging said solution against an external heat sink.

15. The process of claim 1 wherein the lowering of the temperature of the solute/solvent solution to a jumping off temperature is done in at least two stages and wherein the first stage involves heat exchanging said solution against an external heat sink comprised of a body of water from which the initial solute/solvent solution is drawn.

16. The process of claim 1 wherein the solute/solvent solution starting material is seawater.

17. The process of claim 1 wherein the solute/solvent solution liquid is a potassium sulfate solution obtained as a by-product of a cement manufacturing process.

18. The process of claim 1 wherein the solute/solvent solution starting material is an aqueous solution containing dissolved minerals and the solid-phase product is ice that is thereafter melted and used in the production of a carbonated beverage.

19. The process of claim 1 wherein the solute/solvent solution starting material is a nonaqueous industrial waste fluid.

20. The process of claim 1 wherein the solute/solvent solution is a brine of nearly eutectic solute concentration from which magnesium carbonate is recovered.

21. The process of claim 1 wherein a quantity of the liquid phase product containing a solute concentration greater than the initial concentration of the solute/solvent solution starting material is recycled to an earlier stage of the process as a constant recycle quantity of said liquid-phase product.

22. The process of claim 1 wherein a liquid-phase product is subjected to a blow-down procedure and a product of said blow-down procedure is recycled back to an earlier stage of the process as a constant recycle quantity of said product.

23. The process of claim 1 wherein the liquid-phase product is separated into a constant recycle quantity and a remaining blow-down quantity comprised of the starting material total solute and a unsolidified liquid remainder of starting material solvent in proportions up to and approaching eutectic (solubility) composition of the starting material.

24. The process of claim 1 wherein the liquid product of the Joule-Thompson expansion is entirely returned to an inventory of starting material following separation of a solid phase of purified component originally present in excess of eutectic composition.

25. The process of claim 1 wherein the solid-phase product is not a solid-phase form of the solvent having a solute concentration substantially less than the initial concentration of the solute/solvent solution starting material, but rather, because of solute concentration, temperature and/or pressure adjustments to the solute/solvent solution, is a solid-phase product of substantially pure solid-phase solute that is precipitated from the liquid-phase product as a result of the Joule-Thompson free expansion.

26. A process for separating a solute from a solvent that together constitute a solute/solvent solution starting material having an initial solute concentration and an initial temperature, said process comprising:

(1) combining the solute/solvent solution with a constant recycle quantity of a liquid product of increased solute concentration obtained from a Joule-Thompson free expansion step of this process and used as a circulating inventory of said liquid product of increased solute concentration that is recycled in an amount adjusted to control a solute concentration of a combined solution comprised of a portion of the solute/solvent solution and a portion of the liquid product of increased solute concentration;

(2) dissolving into said combined solution a controlled amount of a gas-forming material that will constitute a vapor phase at a system low temperature and pressure state that exists after the Joule-Thompson free expansion step, to produce a gas-forming material/solute/solvent solution;

(3) removing at least a portion of the heat of condensation arising from dissolving vapors of the gas-forming material and solvent into the combined solution by means of heat exchange with an external heat sink;

(4) removing heat from the gas-forming material/solute/solvent solution by means of an internal heat exchange against at least one product of the Joule-Thompson free expansion to bring said solution to a temperature that approaches a jumping off temperature;

(5) placing the solution in a pressure vessel;

(6) bringing the solution in the pressure vessel to a nominal high pressure;

(7) rapidly releasing the nominal high pressure on the solution in the pressure vessel and thereby allowing a major portion of the gas-forming material and a minor portion of the solvent to form vapors that undergo a Joule-Thompson free expansion into a closed second vessel having a nominal low pressure and thereby obtaining three phases of resultant materials that each have a temperature approximating the triple point temperature of the solution and wherein said three phases of resultant materials comprise: a gas-phase product containing the gas-forming material originally dissolved in the solute/solvent solution starting material and vapors of the solvent, a portion of which flow into the second vessel, a liquid-phase product having a solute concentration greater than the initial concentration of the solute/solvent solution starting material and a solid-phase form of the solvent;

(8) collecting at least a portion of the gas-phase product via a jet eductor for reuse in the process;

(9) collecting at least one of the three phases of resultant materials as a product of the process; and (10) recycling the liquid product back into an earlier stage of the process via a heat exchanger that heat exchanges relatively cold liquid-phase product with relatively warm solute/solvent solution.

27. A process for separating a solute from a solvent that together constitute a solute/solvent solution starting material having an initial solute concentration and an initial temperature, said process comprising:

(1) combining the solute/solvent solution with a constant recycle quantity of a liquid product of increased solute concentration obtained from a Joule-Thompson free expansion step of this process and used as a circulating inventory of said liquid product of increased solute concentration that is recycled in an amount adjusted to control a solute concentration of a combined solution comprised of a portion of the solute/solvent solution and a portion of the liquid product of increased solute concentration;

(2) dissolving into said combined solution a controlled amount of a gas-forming material that will constitute a vapor phase at a system low temperature and pressure state that exists after the Joule-Thompson free expansion step, to produce a gas-forming material/solute/solvent solution;

(3) removing heat of condensation arising from dissolving vapors of the gas-forming material and solvent into the combined solution by means of heat exchange with an external heat sink;

(4) removing heat from the gas-forming material/solute/solvent solution by means of an internal heat exchange against at least one product of the Joule-Thompson free expansion to bring said solution to a temperature that approaches a jumping off temperature;

(5) placing the solution in a pressure vessel;

(6) bringing the solution in the pressure vessel to a nominal high pressure;

(7) rapidly releasing the nominal high pressure on the solution in the pressure vessel and thereby allowing a major portion of the gas-forming material and a minor portion of the solvent to form vapors that undergo a Joule-Thompson free expansion into a closed second vessel having a nominal low pressure and thereby obtaining three phases of resultant materials that each have a temperature approximating the triple point temperature of the solution and wherein said three phases of resultant materials comprise: a gas-phase product containing the gas-forming material originally dissolved in the solute/solvent solution starting material and vapors of the solvent, a portion of which flow into the second vessel, a liquid-phase product having a solute concentration greater than the initial concentration of the solute/solvent solution starting material and a solid-phase product that does not have a solute concentration substantially less than the initial concentration of the solute/solvent solution starting material but rather, because of solute concentration, temperature and/or pressure adjustments to the liquid, is a solid-phase product of substantially pure solid-phase, solute that is precipitated from the liquid-phase product as a result of said Joule-Thompson free expansion;

(8) collecting at least a portion of the gas-phase product via a jet eductor for reuse in the process;

(9) collecting at least one of the three phases of resultant materials as a product of the process; and (10) separating the liquid phase into a constant recycle quantity and a remaining "blow-down" quantity comprised of total solute of the starting material and unsolidified remaining solvent of the starting material in proportions up to and approaching the eutectic (solubility) proportion of the starting material solute/solvent solution.

* * * * *